(12) United States Patent
Burke et al.

(10) Patent No.: US 11,848,958 B2
(45) Date of Patent: Dec. 19, 2023

(54) METHODS AND APPARATUS TO DETECT MALWARE BASED ON NETWORK TRAFFIC ANALYSIS

(71) Applicant: McAfee, LLC, Santa Clara, CA (US)

(72) Inventors: Daniel Burke, Hillsboro, OR (US);
Bernard Sapaden, Portland, OR (US);
Jorge Arias, Beaverton, OR (US);
Hemendra Singh, Beaverton, OR (US);
Bhargav Shah, Hillsboro, OR (US)

(73) Assignee: McAfee, LLC, San Jose, CA (US)

( * ) Notice: Subject to any disclaimer, the term of this patent is extended or adjusted under 35 U.S.C. 154(b) by 400 days.

(21) Appl. No.: 16/725,892

(22) Filed: Dec. 23, 2019

(65) Prior Publication Data

US 2021/0194891 A1    Jun. 24, 2021

(51) Int. Cl.
*H04L 9/40* (2022.01)
*G06N 5/04* (2023.01)
*G06F 21/55* (2013.01)

(52) U.S. Cl.
CPC .......... *H04L 63/145* (2013.01); *G06F 21/554* (2013.01); *G06N 5/04* (2013.01); *G06F 2221/033* (2013.01)

(58) Field of Classification Search
CPC ... H04L 63/14–1491; G06F 21/50–577; G06F 2221/033; G06N 5/04
See application file for complete search history.

(56) References Cited

U.S. PATENT DOCUMENTS 10,050,982 B1 *   8/2018   Guerra .............. H04L 63/1416
11,012,414 B2 *   5/2021   Moore .............. H04L 61/1511
(Continued)

FOREIGN PATENT DOCUMENTS

CA       2983429 C  *  4/2020  ......... G06F 21/566
CN   101227275 A  *  7/2008  .............. H04L 9/32
(Continued)

OTHER PUBLICATIONS

The MITRE Corporation, "Multilayer Encryption—Enterprise | MITRE ATT&CK," retrieved from the Internet <https://attack.mitre.org/techniques/T1079/>, retrieved on Dec. 19, 2019 (2 pages).
(Continued)

*Primary Examiner* — Madhuri R Herzog
(74) *Attorney, Agent, or Firm* — HANLEY, FLIGHT AND ZIMMERMAN, LLC

(57) ABSTRACT

Methods, apparatus, systems and articles of manufacture are disclosed to detect malware based on network traffic analysis. An example apparatus includes a classification controller to: in response to a first classification score of a first network traffic sample satisfying a first threshold, determine whether a second classification score of a second network traffic sample satisfies a second threshold; and in response to the second classification score of the second network traffic sample satisfying the second threshold, classify network traffic associated with the first network traffic sample and the second network traffic sample as potentially malicious network traffic; and a remediation controller to, in response to the network traffic being classified as the potentially malicious network traffic, execute a remediation action to remediate malicious activity associated with the potentially malicious network traffic.

27 Claims, 5 Drawing Sheets

(56) References Cited

U.S. PATENT DOCUMENTS

2008/0040710 A1* 2/2008 Chiriac ................ G06F 21/566
                                                     717/136
2017/0279601 A1* 9/2017 Yamane .................... H04L 9/08
2018/0012021 A1* 1/2018 Volkov .................. G06F 21/566
2020/0053104 A1* 2/2020 El-Moussa ............... G06N 3/04

FOREIGN PATENT DOCUMENTS

CN         105357179 A   *  2/2016
CN         110569653 A   *  12/2019

OTHER PUBLICATIONS

Jay Thakkar, "What is SSL Inspection? How does it work?," Hashed Out, retrieved from the Internet <https://www.thesslstore.com/blog/ssl-inspection/>, retrieved on Dec. 23, 2019 (7 pages).

* cited by examiner

METHODS AND APPARATUS TO DETECT MALWARE BASED ON NETWORK TRAFFIC ANALYSIS

FIELD OF THE DISCLOSURE

This disclosure relates generally to malware, and, more particularly, to methods and apparatus to detect malware based on network traffic analysis.

BACKGROUND

Malware (e.g., viruses, worms, trojans, ransomware) is malicious software that is disseminated by attackers to launch a wide range of security attacks, such as stealing users' private information, hijacking devices remotely to deliver massive spam emails, infiltrating a users' online account credentials, etc. The introduction of malware to a computing system may cause serious damages to computer equipment and/or data and/or may cause significant financial loss to Internet users and/or corporations.

Figure 1:
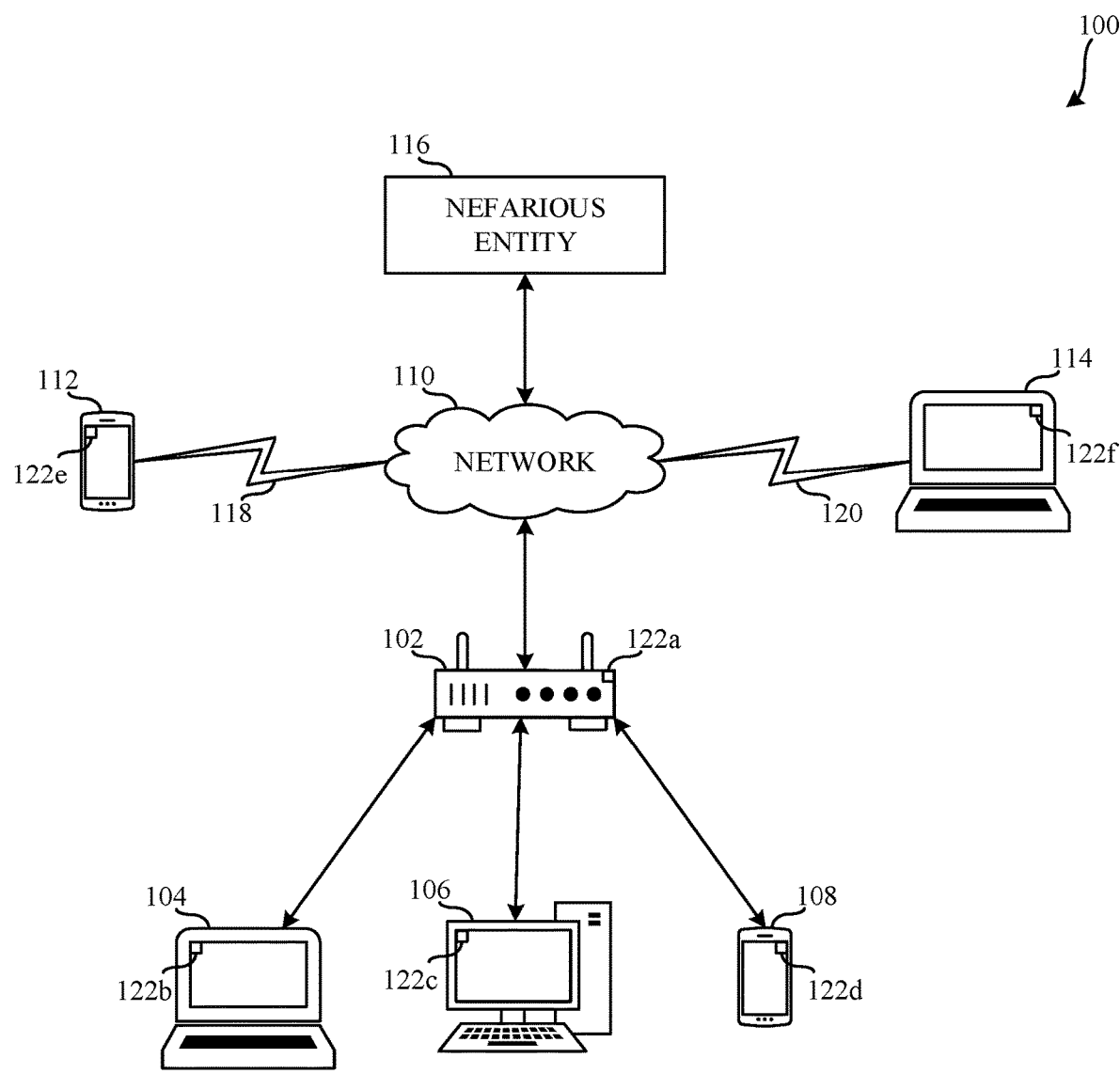
FIG. 1 is an illustration of an example environment including example malware detectors.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Some types of malware communicate with endpoint devices via a network to download files (e.g., staged files, staged files including malicious code, etc.). Some malware is file-less, existing only in memory. For example, file-less malware may reside in volatile memory (e.g., Random Access Memory (RAM)) as a computer memory-based artifact (e.g., a PowerShell script) without writing any of its activity to a computer hard drive. For example, file-less malware can include a command-line shell and associated scripting language, which provides adversarial entities with access to almost everything in a computer utilizing a Windows® operating system. In some examples, file-less malware can include code that is inserted into memory and accessed by and/or otherwise interacts with a legitimate program to facilitate malicious activity. File-less malware can be difficult to detect, and often traditional disk scans fail to detect file-less malware. Whether file-based or file-less, malware can initiate the infection and/or further corruption of an endpoint device by communicating over a network. For example, malware can communicate with an endpoint device over a network and/or communicate with a network from an endpoint device to steal a user's private information, remotely hijack a device to deliver massive spam emails, infiltrate a user's online account credentials, and/or commit other nefarious acts. Some malware obfuscates and/or otherwise encrypts network communications related to nefarious activities to prevent detection. Such obfuscation and/or encryption algorithms can be known and/or reversible based on one or more known key values (e.g., based on MITRE ATT&CK matrices, secure sockets layer (SSL) inspection, etc.).

Examples disclosed herein detect malware based on network traffic analysis. Disclosed examples include detecting malware without relying on an analysis of memory for malicious files and/or file-less malware. Examples disclosed herein utilize the fact that different types of malware use specific obfuscation algorithms and keys to hide their network traffic from traditional network scanners and/or from manual review. Examples disclosed herein utilize these various obfuscation algorithms and/or keys of malware to detect and/or classify the malware and/or a malicious payload.

Examples disclosed herein identify the type of obfuscation or encryption applied to network traffic and use the identified obfuscation and/or encryption to detect the contents of network traffic (e.g., a conversational language, non-executable source code programming languages, executable source code programming languages, executable object code, etc.). For example, examples disclosed herein analyze network traffic based on (a) one or more decryption and/or deciphering algorithms and/or (b) one or more scoring algorithms to identify whether the network traffic includes executable object code (e.g., portable executable files, etc.). Based on whether a network traffic sample satisfies a preliminary-analysis threshold and/or a malware-confirmation threshold, examples disclosed herein can perform additional analysis on confirmation-analysis network traffic samples to classify the network traffic sample. In examples disclosed herein, network traffic samples are classified into unknown or potentially malicious classes to identify those network traffic samples as malicious or not. Examples disclosed herein use the classification of network traffic samples to report and/or remediate malware and/or malicious activity based on the classification of network traffic samples.

FIG. 1 is an illustration of an example environment 100 including example malware detectors. The environment 100 includes an example access point 102, an example first computing device 104, an example second computing device 106, an example third computing device 108, an example network 110, an example fourth computing device 112, an example fifth computing device 114, and an example nefarious entity 116. In the example of FIG. 1, the access point 102, the first computing device 104, the second computing device 106, the third computing device 108, the fourth computing device 112, and the fifth computing device 114 include corresponding ones of example malware detectors 122a-f.

In the illustrated example of FIG. 1, the access point 102 is coupled to the first computing device 104, the second computing device 106, the third computing device 108, and the network 110. The access point 102 includes the first malware detector 122a. The access point 102 is a device that facilitates network communications to and/or from the network 110. For example, the access point 102 can generate a wireless network (e.g., a wireless local area network (WLAN), a wireless personal area network (WPAM), a wireless wide area network (WWAN), etc.) in the environment 100 (e.g., a home, an office, a coffee shop, etc.). In the example, the access point 102 is a router that allows the computing devices 104, 106, 108 to access wirelessly the network 110. In some examples, at least some of the computing devices 104, 106, 108 can access the network 110 via a wired connection to the access point 102. In other examples, the access point 102 is a combination of a modem and a router, a network switch, an ethernet hub, and/or any other device that provides a wireless connection from the computing devices 104, 106, 108 to the network 110. In example FIG. 1, the access point 102 is a router, and the access point 102 accesses the network 110 through a wired connection via a modem. In some examples, the access point 102 can access the network via a cellular connection and/or any other suitable connection.

In the example of FIG. 1, the computing devices 104, 106, 108 are configured to communicate with other devices in the network 110. For example, network traffic can pass to and/or from the access point 102 corresponding to communications between the computing devices 104, 106, 108 and/or other devices in the network 110. In examples disclosed herein, the computing devices 104, 106, 108 can implement a workstation, a personal computer, a tablet computer, a smartphone, a laptop, and/or any other type of computing device. In the example of FIG. 1, the computing devices 104, 106, 108 communicate with other devices in the network 110 via a wireless connection to the access point 102. In additional or alternative examples, the computing devices 104, 106, 108 communicate with other devices in the network 110 via a wired connection to the access point 102.

In the example of FIG. 1, the network 110 is a system of interconnected devices exchanging data. The example network 110 may be implemented using any type of public or private network including the Internet, a telephone network, a local area network (LAN), a cable network, and/or a wireless network. To enable communication via the network 110, the example access point 102 includes a communication interface that enables a connection to an Ethernet cable, a digital subscriber line (DSL), a telephone line, a coaxial cable, and/or any wireless connection, etc. In some examples, the example network 110 provides the requested data to be organized into data packets. To enable connection to the access point 102, the computing devices 104, 106, 108, 112, 114 include communication interfaces that enable a connection the access point 102. In some examples, the communication interface is wired (e.g., an Ethernet connection). In other examples, the communication interface is wireless (e.g., a WLAN, a cellular network, etc.).

In the example of FIG. 1, the computing devices 112, 114 are configured to communicate with other devices in the network 110. For example, network traffic can pass to and/or from the computing devices 112, 114 from and/or to other devices in the network 110. In examples disclosed herein, the computing devices 112, 114 can implement a workstation, a personal computer, a tablet computer, a smartphone, a laptop, and/or any other type of computing device. In the example of FIG. 1, the computing devices 112, 114 include capabilities to communicate with other devices in the network 110. As shown in FIG. 1, the computing devices 112, 114 includes the capabilities to send information through a wireless communication system (e.g., a cellular communication system) via wireless communication links 118, 120, respectively.

In the illustrated example of FIG. 1, the wireless communication links 118, 120 are cellular communication links. However, any other method and/or system of communication may additionally or alternatively be used such as, for example, an Ethernet connection, a Bluetooth connection, a Wi-Fi connection, etc. Further, the wireless communication links 118, 120 of FIG. 1 implement a cellular connection via a Global System for Mobile Communications (GSM). However, any other systems and/or protocols for communications may be used such as, for example, Time Division Multiple Access (TDMA), Code Division Multiple Access (CDMA), Worldwide Interoperability for Microwave Access (WiMAX), Long Term Evolution (LTE), etc.

In the example of FIG. 1, the nefarious entity 116 is an entity that is a malicious actor perpetuating an attack on at least some of the access point 102 and/or one or more of the computing devices 104, 106, 108, 112, 114. For example, the nefarious entity 116 can transmit, communicate with, activate, and/or host malware that targets at least some of the access point 102 and/or one or more of the computing devices 104, 106, 108, 112, 114. For example, the malware can include computer viruses, computer worms, trojan viruses, rootkits, adware, spyware, bots, file-less malware, ransomware, ghost mining, and/or any other type of malicious software, code, programs, etc. In the example of FIG. 1, the nefarious entity 116 is at least one computing device (e.g., a laptop, a server, etc.) that communicates with at least some of the access point 102 and/or one or more of the computing devices 104, 106, 108, 112, 114. While illustrated as a single entity, in some examples, the nefarious entity 116 can be implemented by a number of computers. In some examples, the nefarious entity 116 can be distributed between many computers. In additional or alternative examples, the nefarious entity 116 can be geographically diverse. In other examples, the nefarious entity 116 can include multiple parties working in conjunction with one another.

In the illustrated example of FIG. 1, the access point 102, the first computing device 104, the second computing device 106, the third computing device 108, the fourth computing device 112, and the fifth computing device 114 includes the malware detectors 122a-f. In the example of FIG. 1, at least some of the malware detectors 122a-f can be implemented in and/or by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

In the example of FIG. 1, the malware detectors 122a-f monitor network traffic at the respective access point 102 and computing devices 104, 106, 108, 112, 114 and generate classification scores based on the network traffic. Based on the classification scores, the malware detectors 122a-f can report and/or remediate malicious activity at the respective access point 102 and computing devices 104, 106, 108, 112, 114. For example, the malware detectors 122a-f can obtain a first sample of network traffic at the respective access point 102 and computing devices 104, 106, 108, 112, 114.

In the example illustrated in FIG. 1, the malware detectors 122a-f can set a preliminary-analysis threshold and a malware-confirmation threshold to which to compare classification scores. For example, the preliminary-analysis threshold and the malware-confirmation threshold can correspond to a classification score value representative of how likely it is that a network communication and/or network traffic sample is malware. For example, a low score can correspond to a network traffic sample including a conversational language (e.g., less likely to be malicious) and a high score can correspond to a network traffic sample including a machine-executable object code (e.g., more likely to be malicious). Based on whether the classification scores satisfy the preliminary-analysis threshold and/or the malware-confirmation threshold the malware detectors 122a-f can report malicious activity to and/or remediate malicious activity at the respective access point 102 and computing devices 104, 106, 108, 112, 114.

In the illustrated example of FIG. 1, the malware detectors 122a-f are configured to execute various decryption and/or deciphering algorithms to determine whether one or more network traffic samples can be deciphered and/or decrypted. In response to deciphering and/or decrypting the network traffic sample to a plain text representation, the malware detectors 122a-f determine a score associated with the similarity of the plain text representation of the one or more network traffic samples to a conversational language (e.g., English, Spanish, Italian, French, Arabic, etc.), a non-executable source code programming language (e.g., pre-compiled programming languages, C, C+, C#, etc.), an executable source code programming language (e.g., Java, Swift, Python, etc.) and/or executable object code (e.g., compiled binary code, portable executable files, complied executable object code, etc.). In some examples, multiple scores can be determined for multiple conversational languages, multiple non-executable source code programming languages, multiple executable source code programming languages, and/or multiple executable object code types. In some examples, a first score is calculated for the presence of a conversational language used at a computing device, a second score is calculated for the presence of a non-executable source code programming language, a third score is calculated for the presence of an executable source code programming language, and/or a fourth score is calculated for the presence of an executable object code language. For example, scores (e.g., conversational language scores, non-executable source code programming language scores, executable source code programming language scores, executable object code scores, combined scores, classification scores, etc.) can be based on a numeric range of a minimum value to a maximum value. In some examples, the minimum value may represent a lowest likelihood of malicious activity, and a maximum value may represent a highest likelihood of malicious activity. Examples disclosed herein can use any suitable scale (e.g., 0-10, 1-10, 1-50, 1-100, 10-100, etc.) The malware detectors 122a-f determine a classification score for the sample of network traffic by combining any number of scores and comparing the classification score to a threshold. Based on whether the classification score satisfies (e.g., is greater than or equal to) a threshold (e.g., a preliminary-analysis threshold and/or a malware-confirmation threshold), the malware detectors 122a-f classify the network traffic sample as potentially malicious or unknown.

When determining a classification score, the malware detectors 122a-f can weight scores (e.g., conversational language scores, executable source code programming language scores, etc.) based on how likely network traffic relates to malicious activity the scoring criteria (e.g., conversational language, non-executable source code programming language, executable source code programming language, executable object code, etc.) can be indicative of malware. Weighting scores enables the malware detectors 122a-f to efficiently classify network traffic samples as potentially malicious and/or unknown based on placing a higher reliance on criteria more likely to indicate potentially malicious activity. For example, the presence of conversational language in network traffic being transmitted to and/or from at least one of the access point 102 and/or one or more of the computing devices 104, 106, 108, 110, 112, 114 may be a normal occurrence and as such, a classification score for conversational language may be weighted with a comparably lower weight than classification scores for other types of text (e.g., a non-executable source code programming language score, an executable source code programming language score, and/or an executable object code programming language score). In another example, the presence of non-executable source code programming languages, executable source code programming languages, and/or executable object code programming languages in network traffic being transmitted to and/or from at least one of the access point 102 and/or one or more of the computing devices 104, 106, 108, 110, 112, 114 may be abnormal and as such, corresponding classification scores may be weighted with a comparably higher weight than classification scores of other types of text associated with a lower likelihood of malicious activity (e.g., a conversational language score). In other examples disclosed herein, the presence of conversational languages, non-executable source code programming languages, executable source code programming languages, and/or executable object code programming languages may be normal and/or abnormal based on network traffic at a computing device. Weighting of scores is described in additional detail below. A classification score can represent how much a network traffic sample is representative of malware and/or how likely a network traffic sample is related to and/or corresponds to malware. As an example, a network traffic sample that includes a substantial amount of conversational language (e.g., English) can return a low classification score (e.g., 1-4) indicating it has a low likelihood of being malware, whereas a network traffic sample that includes a substantial amount of executable object code can return a high classification score (e.g., 5-10) indicating it has a higher likelihood of being malware. As another example, an executable source code programming language score can correspond to how similar a network traffic sample is to an executable source code programming language. As an example, a network traffic sample that includes a substantial amount of an executable source code programming language (e.g., Python) can return an executable source code programming language score between 5 and 10.

In some examples, the evaluation and/or classification of network traffic can involves a two-stage scoring process. For example, in a first stage, the malware detectors 122a-f can determine one or more scores associated with how similar a plain text representation of a network traffic sample is to a language (e.g., a conversational language, a non-executable source code programming language, an executable source code programming language, an executable object code programming language, etc.). In the second stage, the malware detectors 122a-f can weight the first stage scores based on the amounts of probabilities of different types of text (e.g., conversational language, non-executable source code programming language, executable source code programming language, executable object code, etc.) being indicative of malware. As an example, in the first stage, a network traffic sample including a substantial amount of conversational language can return a high score for similarity with conversational language. In such an example, in the second stage, the malware detectors 122a-f can determine a low classification score for the network traffic sample (e.g., a likely not malicious network traffic sample and/or unknown network traffic sample) by assigning a low weight value to the first stage due to the strong similarity with a conversational language, which has a low probability of a malicious threat. As another example, in the first stage, a network traffic sample including a substantial amount of executable object code can return a high score for similarity with executable object code. In such an example, in the second stage, the malware detectors 122a-f can determine a high classification score for the network traffic sample (e.g., a potentially malicious network traffic sample) by assigning a high weight value to the first stage score due to the strong similarity with a type of text having a stronger likelihood of relating to malicious activity. For example, if a network traffic sample includes a large portion of conversational text and a relatively smaller portion of executable object code, examples disclosed herein advantageously detect the executable object code as malicious and classify the network traffic sample as potentially malicious. Thus, examples disclosed herein advantageously counter nefarious entities that may attempt to bury malicious code and/or malware within a large portion of otherwise benign text.

In the example of FIG. 1, if the classification score of a preliminary-analysis network traffic sample satisfies a preliminary-analysis threshold, the malware detectors 122a-f can obtain one or more additional samples of network traffic referred to herein as confirmation-analysis network traffic samples at the respective access point 102 and computing devices 104, 106, 108, 112, 114. Alternatively, if the classification score of the preliminary-analysis network traffic sample satisfies the preliminary-analysis threshold and the malware-confirmation threshold, the malware detectors 122a-f can report and/or remediate malicious activity at the respective access point 102 and computing devices 104, 106, 108, 112, 114.

In the example illustrated in FIG. 1, the malware detectors 122a-f can determine a score associated with the similarity of the plain text representation of the one or more confirmation-analysis network traffic samples to a conversational language, a non-executable source programming language, an executable source code programming language, and/or executable object code programming language. The malware detectors 122a-f determine a classification score for the one or more confirmation-analysis network traffic samples and compare the classification score to the malware-confirmation threshold. Based on whether the classification score satisfies (e.g., is greater than or equal to) the malware-confirmation threshold, the malware detectors 122a-f can classify one or more of the one or more confirmation-analysis network traffic samples as potentially malicious or unknown. In response to classifying either the preliminary-analysis network traffic sample and/or at least one of the one or more confirmation-analysis network traffic samples as potentially malicious, the malware detectors 122a-f can report and/or remediate malicious activity at the respective access point 102 and computing devices 104, 106, 108, 112, 114.

In some examples, the malware detectors 122a-f can be implemented as executable object code (e.g., machine readable instructions) transmitted from a server to the respective access point 102 and computing devices 104, 106, 108, 112, 114. In other examples, the malware detectors 122a-f can be implemented as machine readable instructions stored on a non-transitory machine readable medium. In some examples, the malware detectors 122a-f can be implemented as additional malware protection at the respective access point 102 and computing devices 104, 106, 108, 112, 114. In additional or alternative examples, the malware detectors 122a-f can be implemented as an additional feature to existing malware detection software or as part of a network security suite.

Figure 2:
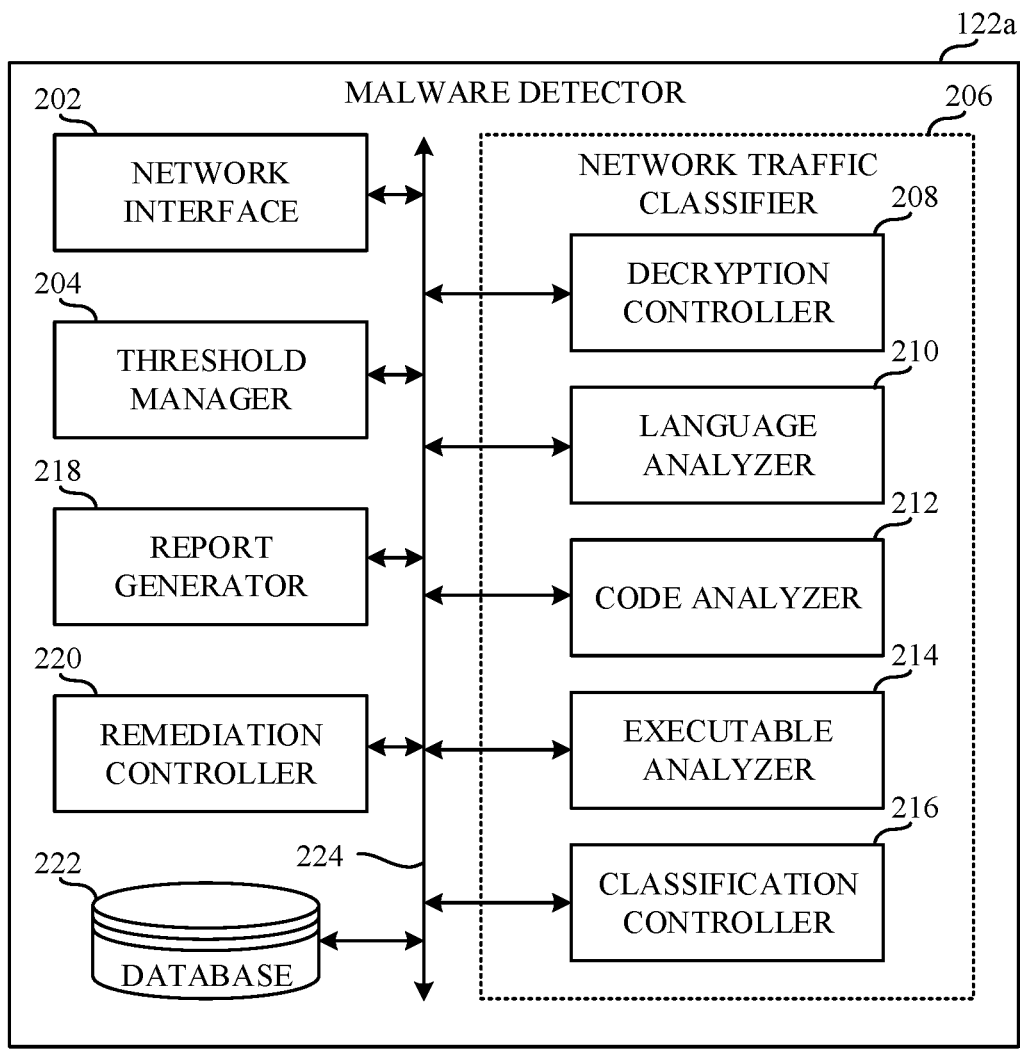
FIG. 2 is a block diagram of an example malware detector that may be implemented in the example environment of FIG. 1.

FIG. 2 is a block diagram of the example malware detector 122a of FIG. 1. Although only one malware detector 122a is shown in FIG. 2, the other malware detectors 122b-f of FIG. 1 may be implemented substantially similar or identical to the malware detector 122a shown in FIG. 2 and described below. For example, the malware detector 122a includes an example network interface 202, an example threshold manager 204, and an example network traffic classifier 206. In the example of FIG. 2, the network traffic classifier 206 includes an example decryption controller 208, an example language analyzer 210, an example code analyzer 212, an example executable analyzer 214, and an example classification controller 216. Additionally, the example malware detector 122a includes an example report generator 218, an example remediation controller 220, and an example database 222.

In the example of FIG. 2, any of the network interface 202, the threshold manager 204, the network traffic classifier 206, the decryption controller 208, the language analyzer 210, the code analyzer 212, the executable analyzer 214, the classification controller 216, the report generator 218, the remediation controller 220, and/or the database 222 may communicate via an example communication bus 224. In examples disclosed herein, the communication bus 224 may be implemented using any suitable wired and/or wireless communication.

In the example illustrated in FIG. 2, the network interface 202 can be implemented by one or more circuits, such as, a network interface controller, a network interface card, a network adapter, and/or any other suitable hardware circuitry. The example network interface 202 is configured to obtain network traffic samples corresponding to communications associated with a host device. For example, the network interface 202 of the first computing device 104 (FIG. 1) obtains network traffic samples corresponding to the first computing device 104. To obtain network traffic samples, the network interface 202 can copy and/or otherwise replicate network traffic. In some examples, the network interface 202 can be configured to collect network traffic samples on a periodic basis.

Additionally, the example network interface 202 is configured to communicate with devices and/or applications external to the malware detector 122a. For example, the network interface 202 of the first computing device 104 (FIG. 1) can communicate with other components (e.g., hardware components, software components, etc.) of the first computing device 104. In some examples, the network interface 202 identifies a source address and/or a destination address associated with the samples of network traffic. For example, the source address and/or destination address can be an internet protocol (IP) address and/or a media access control (MAC) address. In some examples, the source address and/or the destination address can be a memory address in a respective one of the access point 102 and the computing devices 104, 106, 108, 112, 114. In some examples, the network interface 202 can identify a program and/or an application that initiated a network communication.

In some examples, the network interface 202 implements example means for interfacing. The interfacing means is implemented by executable instructions such as those illustrated by at least blocks 302, 326, and 328 of FIG. 3, which may be executed on at least one processor such as the example processor 512 shown in the example of FIG. 5. In other examples, the interfacing means is implemented by hardware logic, hardware implemented state machines, logic circuitry, and/or any other combination of hardware, software, and/or firmware.

In the example of FIG. 2, the threshold manager 204 can be implemented by one or more analog or digital circuit(s), logic circuits, programmable processor(s), programmable controller(s), GPU(s), DSP(s), ASIC(s), PLD(s) and/or FPLD(s). In the example of FIG. 2, the threshold manager 204 is configured to set a preliminary-analysis threshold and/or a malware-confirmation threshold associated with network traffic classification. For example, the preliminary-analysis threshold can correspond to a first level of similarity to malware while the malware-confirmation threshold can correspond to a second level of similarity to malware. In some examples, the preliminary-analysis threshold and/or the malware-confirmation threshold can correspond to levels of similarity of network traffic to network traffic known to be related to malware. In examples disclosed herein, the malware-confirmation threshold of similarity is greater than the preliminary-analysis threshold of similarity. In some examples, the preliminary-analysis threshold and/or the malware-confirmation threshold can be set by accessing a memory address and/or memory addresses including preset threshold values.

In the illustrated example of FIG. 2, the threshold manager 204 selects a preliminary-analysis threshold to compare preliminary-analysis network traffic sample against. Upon further analysis of network traffic, the threshold manager 204 can select a malware-confirmation threshold against which to compare a confirmation-analysis network traffic sample. In some examples, the threshold manager 204 can apply additional or alternative thresholds to ones of the second network traffic samples upon analysis of each of the confirmation-analysis network traffic samples.

In some examples, the example threshold manager 204 implements example means for managing thresholds. The threshold management means is implemented by executable instructions such as those illustrated by at least blocks 304, 306, 308, and 330 of FIG. 3, which may be executed on at least one processor such as the example processor 512 shown in the example of FIG. 5. In other examples, the threshold management means is implemented by hardware logic, hardware implemented state machines, logic circuitry, and/or any other combination of hardware, software, and/or firmware.

In the example of FIG. 2, the network traffic classifier 206 can be implemented by one or more analog or digital circuit(s), logic circuits, programmable processor(s), programmable controller(s), GPU(s), DSP(s), ASIC(s), PLD(s) and/or FPLD(s).

In the example illustrated in FIG. 2, the network traffic classifier 206 analyzes network traffic samples and classifies the network traffic samples. For example, the network traffic classifier 206 can classify network traffic samples as potentially malicious and/or unknown. In some examples, the network traffic classifier 206 can classify the software, applications, hardware, and/or other resources at or associated with a source address and/or a destination address of a network communication as potentially malicious or unknown.

In some examples, the example network traffic classifier 206 implements example means for classifying network traffic. The network traffic classification means is implemented by executable instructions such as those illustrated by at least blocks 310, 312, 314, 320, 322, 332, 334, 336, and 338 of FIG. 3, and/or at least block 402, 404, 406, 408, 410, 412, 413, 414, 416, 417, 418, 420, 422, 424, and 426 of FIG. 4, which may be executed on at least one processor such as the example processor 512 shown in the example of FIG. 5. In other examples, the network traffic classification means is implemented by hardware logic, hardware implemented state machines, logic circuitry, and/or any other combination of hardware, software, and/or firmware.

In the example of FIG. 2, the decryption controller 208 can be implemented by one or more analog or digital circuit(s), logic circuits, programmable processor(s), programmable controller(s), GPU(s), DSP(s), ASIC(s), PLD(s) and/or FPLD(s). The example decryption controller 208 is configured to select from one or more algorithms to decipher and/or decrypt a network traffic sample. For example, the decryption controller 208 can select from a preloaded list of deciphering and/or decryption algorithms associated with malware. For example, known malware 4H RAT obfuscates C2 communications (e.g., command and control communications) using a 1-byte XOR with the key 0xBE. The XOR operation is symmetrical encryption, so the associated decryption algorithm for 4H RAT involves performing an XOR operation on each byte with 0xBE.

In the illustrated example of FIG. 2, after selecting a deciphering and/or decryption algorithm, the decryption controller 208 executes the deciphering and/or decryption algorithm to decrypt and/or otherwise decipher the network traffic sample. In response to deciphering and/or decrypting the network traffic sample with the selected deciphering and/or decryption algorithm, the example decryption controller 208 obtains a plain text representation of the network traffic sample. Alternatively, in response to not deciphering and/or decrypting the network traffic sample with the selected deciphering and/or decryption algorithm, the example decryption controller 208 determines whether there are any additional deciphering and/or decryption algorithms. If there are additional deciphering and/or decryption algorithms, the example decryption controller 208 selects an alternative deciphering and/or decryption algorithm to decipher and/or decrypt a network traffic sample.

In some examples, the example decryption controller 208 implements example means for decrypting. The example decryption means is implemented by executable instructions such as those illustrated by at least blocks 402, 404, 406, 408, and 412 of FIG. 4, which may be executed on at least one processor such as the example processor 512 shown in the example of FIG. 5. In other examples, the decryption means is implemented by hardware logic, hardware implemented state machines, logic circuitry, and/or any other combination of hardware, software, and/or firmware.

In the example of FIG. 2, the language analyzer 210 can be implemented by one or more analog or digital circuit(s), logic circuits, programmable processor(s), programmable controller(s), GPU(s), DSP(s), ASIC(s), PLD(s) and/or FPLD(s). The example language analyzer 210 is configured to determine a similarity of the plain text representation of a network traffic sample to a conversational language. For example, the language analyzer 210 can determine the similarity of the plain text representation of the network traffic sample to English language. In additional or alternative examples, the language analyzer 210 can determine the similarity of the plain text representation of the network traffic sample to any other conversational language.

In some examples, the language analyzer 210 can determine a similarity of the plain text representation of the network traffic sample based on a letter frequency analysis (e.g., a differential letter analysis) of the network traffic sample. In additional or alternative examples, the language analyzer 210 can determine a similarity of the plain text representation of the network traffic sample based on n-gram checking, ASCII character checks, ASCII character pattern recognition checks, and/or any other suitable language analysis. In some examples, the language analyzer 210 can determine a score of the network traffic sample based on the language analysis.

In some examples, the example language analyzer 210 implements example means for analyzing language. The example language analysis means is implemented by executable instructions such as those illustrated by at least block 414 of FIG. 4, which may be executed on at least one processor such as the example processor 512 shown in the example of FIG. 5. In other examples, the language analysis means is implemented by hardware logic, hardware implemented state machines, logic circuitry, and/or any other combination of hardware, software, and/or firmware.

In the example of FIG. 2, the code analyzer 212 can be implemented by one or more analog or digital circuit(s), logic circuits, programmable processor(s), programmable controller(s), GPU(s), DSP(s), ASIC(s), PLD(s) and/or FPLD(s). The example code analyzer 212 is configured to determine a similarity of the plain text representation of a network traffic sample to a programming language. For example, the code analyzer 212 can determine the similarity of the plain text representation of the network traffic sample to Python. In additional or alternative examples, the code analyzer 212 can determine the similarity of the plain text representation of the network traffic sample to any other programming language.

In some examples, the code analyzer 212 can determine a similarity of the plain text representation of the network traffic sample based on source code keywords, symbols, and syntax of a programming language. In additional or alternative examples, the code analyzer 212 can determine a similarity of the plain text representation of the network traffic sample based on valid ASCII code frequency checks to determine if the deciphered code matches a valid ASCII set that can be used for source code and/or strings. In some examples, the code analyzer 212 can determine a score of the network traffic sample based on the code analysis.

In some examples, the example code analyzer 212 implements example means for analyzing code. The example code analysis means is implemented by executable instructions such as those illustrated by at least blocks 416 and 417 of FIG. 4, which may be executed on at least one processor such as the example processor 512 shown in the example of FIG. 5. In other examples, the code analysis means is implemented by hardware logic, hardware implemented state machines, logic circuitry, and/or any other combination of hardware, software, and/or firmware.

In the example of FIG. 2, the executable analyzer 214 can be implemented by one or more analog or digital circuit(s), logic circuits, programmable processor(s), programmable controller(s), GPU(s), DSP(s), ASIC(s), PLD(s) and/or FPLD(s). The example executable analyzer 214 is configured to determine a similarity of the plain text representation of a network traffic sample to an executable file. For example, the executable analyzer 214 can determine the similarity of the plain text representation of the network traffic sample to that of portable executable files. In additional or alternative examples, the executable analyzer 214 can determine the similarity of the plain text representation of the network traffic sample to any other executable file.

In some examples, the executable analyzer 214 can determine a similarity of the plain text representation of the network traffic sample based on data type identifiers indicative of an executable file. An example data type identifier is a MIME type identifier that indicates that the plain text of the network traffic sample may represent an embedded portable executable file. Other examples of data type identifiers include file extensions, file metadata and/or other suitable data type identifiers that indicate that the plain text of the network traffic sample may represent an embedded portable executable file.

In some examples, the example executable analyzer 214 implements example means for analyzing executables. The example executable analysis means is implemented by executable instructions such as those illustrated by at least block 418 of FIG. 4, which may be executed on at least one processor such as the example processor 512 shown in the example of FIG. 5. In other examples, the executable analysis means is implemented by hardware logic, hardware implemented state machines, logic circuitry, and/or any other combination of hardware, software, and/or firmware.

In the example of FIG. 2, the classification controller 216 can be implemented by one or more analog or digital circuit(s), logic circuits, programmable processor(s), programmable controller(s), GPU(s), DSP(s), ASIC(s), PLD(s) and/or FPLD(s). The example classification controller 216 is configured to determine whether a network traffic sample has been classified as potentially malicious or unknown. For example, the classification controller 216 can determine whether, based on the preliminary-analysis threshold, a preliminary-analysis network traffic sample has been classified as potentially malicious. In response to determining that the network traffic sample has been classified as potentially malicious according to the preliminary-analysis threshold, the example classification controller 216 determines whether the classification score generated on the preliminary-analysis network traffic sample satisfies the malware-confirmation threshold.

In the example illustrated in FIG. 2, in response to determining that the classification score for a preliminary-analysis network traffic sample satisfies the malware-confirmation threshold, the classification controller 216 can indicate that the network traffic sample is potentially malicious and/or potentially related to malware. If the network traffic sample does not satisfy a threshold and/or the network traffic sample cannot be deciphered and/or decrypted during analysis, the example classification controller 216 can classify the network traffic sample as unknown and/or indicate that the network traffic sample is not malicious and/or not related to malware.

In the example of FIG. 2, the classification controller 216 can determine classification score (e.g., an overall score) for a network traffic sample indicative of whether the sample is malicious and/or the sample corresponds to malware. For example, the classification score corresponds to an overall similarity of a network traffic sample to malware. For example, the classification controller 216 can generate a classification score for the network traffic sample based on a combination of one or more of the conversational language score, the non-executable source code programming language score, the executable source code programming language score, and/or the executable object code score. For example, to generate the classification score, the classification controller 216 can attribute a weight to the conversational language score, a weight to the non-executable source code programming language score, a weight to the executable source code programming language score, and/or a weight to the executable object code score. For example, the classification controller 216 can multiply selected ones of the scores by a value to increase and/or decrease the weight of the selected ones of the scores. The example classification controller 216 can add the largest of the three scores to a fractional combination of the one or more other scores. For example, the classification controller 216 can sum two other scores and divide the sum by four. In additional or alternative examples, the classification controller 216 can weigh the scores by any suitable weighting method.

In the example of FIG. 2, the classification controller 216 can determine whether the combined score satisfies a threshold value selected by the threshold manager 204. In response to the combined score satisfying the threshold value, the example classification controller 216 can classify the network traffic sample as malicious and/or potentially corresponding to malware. In response to the combined score not satisfying the threshold value, the example classification controller 216 can classify the network traffic sample as unknown and/or not related to malware. Subsequently, the example classification controller 216 can transmit a classification package including at least the classification score. In some examples, the classification package can include an indication of whether the network traffic sample is malicious and/or corresponds to malware. The classification package can additionally or alternatively include the decryption and/or deciphering algorithm that allowed decryption of the network traffic sample.

In the example of FIG. 2, the classification controller 216 is additionally or alternatively configured to determine whether the classification controller 216 is configured to perform a malware scan. For example, an additional software package may be installed and/or a user parameter may be selected to allow for malware scans. In response to determining that the classification controller 216 is configured to perform a malware scan, the example classification controller 216 can execute a malware scan to determine if the potentially malicious network traffic sample corresponds to malware. Alternatively, in response to determining that the classification controller 216 is not configured to perform a malware scan, the example classification controller 216 can indicate that the network traffic sample is potentially malicious.

In the example of FIG. 2, if the classification controller 216 determines that the potentially malicious network traffic sample does not correspond to malware, the classification controller 216 can indicate that that the network traffic sample does not correspond to malware. If the example classification controller 216 determines that the potentially malicious network traffic sample does correspond to malware, the classification controller 216 can indicate that that the network traffic sample corresponds to malware.

In some examples, the example classification controller 216 implements example means for classifying. The example classification means is implemented by executable instructions such as those illustrated by at least blocks 312, 314, 320, 322, 334, 336, and 338 of FIG. 3, and/or at least blocks 410, 420, 422, 424, and 426 of FIG. 4, which may be executed on at least one processor such as the example processor 512 shown in the example of FIG. 5. In other examples, the classification means is implemented by hardware logic, hardware implemented state machines, logic circuitry, and/or any other combination of hardware, software, and/or firmware.

In the example of FIG. 2, the report generator 218 can be implemented by one or more analog or digital circuit(s), logic circuits, programmable processor(s), programmable controller(s), GPU(s), DSP(s), ASIC(s), PLD(s) and/or FPLD(s). The example report generator 218 is configured to generate a report indicating that the that a potentially malicious file and/or potentially malware has been detected at the respective access point 102 and computing devices 104, 106, 108, 112, 114. The report can additionally or alternatively include the information included in the classification package.

In some examples, the example report generator 218 implements example means for generating reports. The example report generating means is implemented by executable instructions such as those illustrated by at least block 316 of FIG. 3, which may be executed on at least one processor such as the example processor 512 shown in the example of FIG. 5. In other examples, the report generating means is implemented by hardware logic, hardware implemented state machines, logic circuitry, and/or any other combination of hardware, software, and/or firmware.

In the example of FIG. 2, the remediation controller 220 can be implemented by one or more analog or digital circuit(s), logic circuits, programmable processor(s), programmable controller(s), GPU(s), DSP(s), ASIC(s), PLD(s) and/or FPLD(s). The example remediation controller 220 is configured to remediate malicious activity and/or malware at the respective access point 102 and computing devices 104, 106, 108, 112, 114 based on whether the classification controller 216 indicates that malware has been detected and/or that a network traffic sample is potentially malicious. For example, the remediation controller 220 can block network traffic between the source address and destination address, alert additional security software (e.g., alert security software) at the respective access point 102 and computing devices 104, 106, 108, 112, 114. In additional or alternative examples, the remediation controller 220 can quarantine files corresponding to a process, a program, and/or an application that initiated potentially malicious network traffic, stopping (e.g., halting, deleting, freezing, etc.) a process, a program, and/or an application in memory that initiated potentially malicious network traffic, blocking communications including a destination address, etc.

In some examples, the example remediation controller 220 implements example means for remediating. The example remediation means is implemented by executable instructions such as those illustrated by at least blocks 318 and 324 of FIG. 3, which may be executed on at least one processor such as the example processor 512 shown in the example of FIG. 5. In other examples, the remediation means is implemented by hardware logic, hardware implemented state machines, logic circuitry, and/or any other combination of hardware, software, and/or firmware.

In the illustrated example of FIG. 2, the database 222 is provided to store data associated with analyzing network traffic. For example, the database 222 can store a list of decryption and/or deciphering algorithms, one or more scores associated with network traffic analysis, one or more combined scores associated with network traffic analysis, one or more threshold values, one or more classification packages, one or more reports, one or more remediation actions, and/or one or more results of remediation actions. The example database 222 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example database 222 can additionally or alternatively be implemented by double data rate (DDR) memories, such as DDR, DDR2, DDR3, DDR4, mobile DDR (mDDR), etc. The example database 222 can additionally or alternatively be implemented by one or more mass storage devices such as hard disk drive(s), compact disk drive(s), digital versatile disk drive(s), solid-state disk drive(s), etc. While in the illustrated example the database 222 is illustrated as a single database, the database 222 can be implemented by any number and/or type(s) of databases. Furthermore, the data stored in the example database 222 can be in any data format such as, for example, binary data, comma delimited data, tab delimited data, structured query language (SQL) structures, etc.

While an example manner of implementing the malware detectors 122a-f of FIG. 1 is illustrated in FIG. 2, one or more of the elements, processes and/or devices illustrated in FIG. 2 may be combined, divided, re-arranged, omitted, eliminated and/or implemented in any other way. Further, the example network interface 202, the example threshold manager 204, the example network traffic classifier 206, the example decryption controller 208, the example language analyzer 210, the example code analyzer 212, the example executable analyzer 214, the example classification controller 216, the example report generator 218, the example remediation controller 220, the example database 222, and/or, more generally, the example malware detectors 122a-f of FIG. 2 may be implemented by hardware, software, firmware and/or any combination of hardware, software and/or firmware. Thus, for example, any of the example network interface 202, the example threshold manager 204, the example network traffic classifier 206, the example decryption controller 208, the example language analyzer 210, the example code analyzer 212, the example executable analyzer 214, the example classification controller 216, the example report generator 218, the example remediation controller 220, the example database 222, and/or, more generally, the example malware detectors 122a-f of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network interface 202, the example threshold manager 204, the example network traffic classifier 206, the example decryption controller 208, the example language analyzer 210, the example code analyzer 212, the example executable analyzer 214, the example classification controller 216, the example report generator 218, the example remediation controller 220, the example database 222, and/or, more generally, the example malware detectors 122a-f of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example malware detectors 122a-f of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
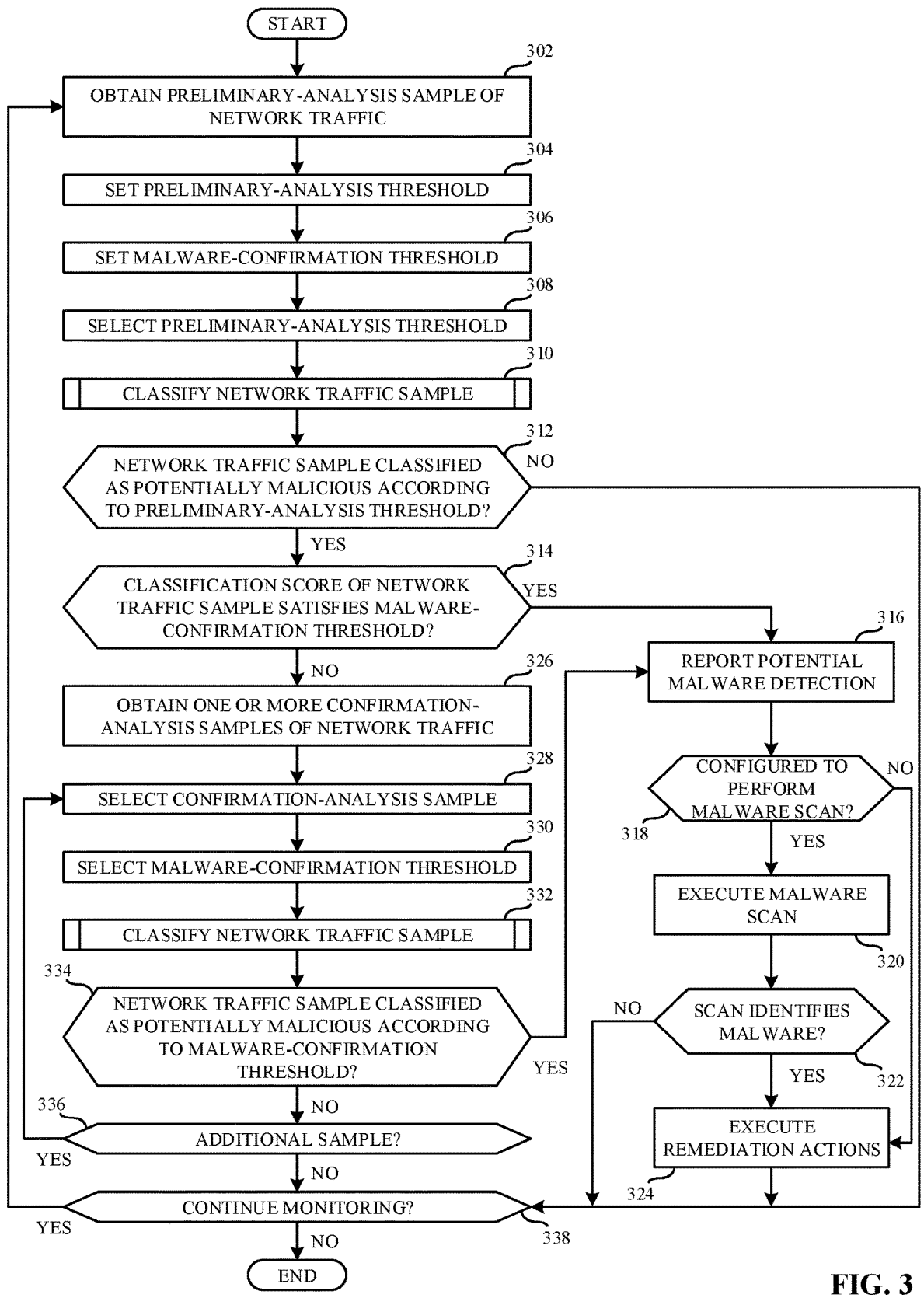
FIG. 3 is a flowchart representative of machine readable instructions which may be executed to implement at least one of the malware detectors of FIGS. 1 and/or 2.
Figure 4:
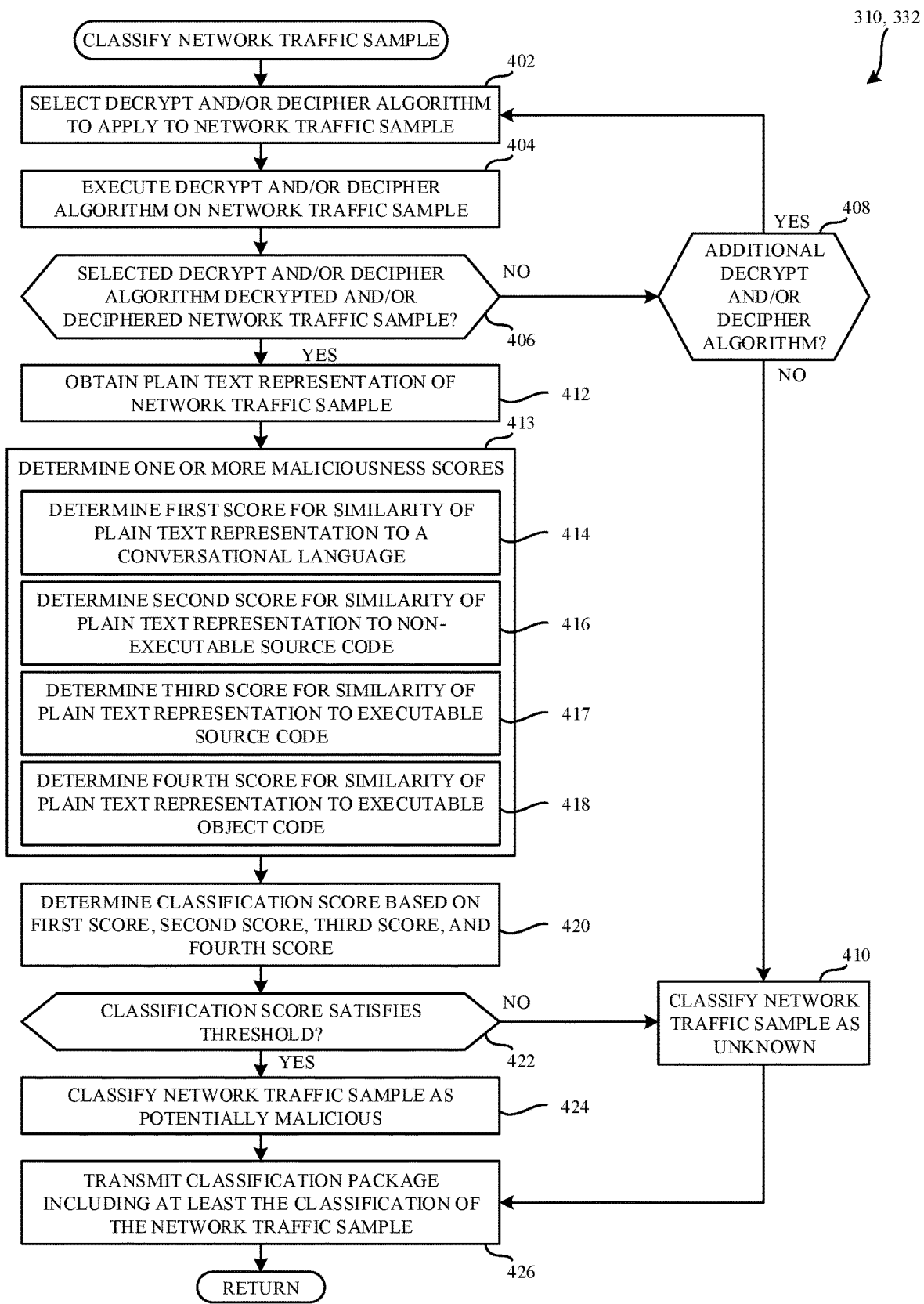
FIG. 4 is a flowchart representative of example machine readable instructions which may be executed to implement at least one of the malware detectors of FIGS. 1 and/or 2 to classify network traffic samples.

Flowcharts representative of example hardware logic, machine readable instructions, hardware implemented state machines, and/or any combination thereof for implementing the example malware detectors 122a-f of FIG. 1 and/or FIG. 2 are shown in FIGS. 3 and 4. The machine readable instructions may be one or more executable programs or portion(s) of an executable program(s) for execution by a computer processor such as the processor 512 shown in the example processor platform 500 discussed below in connection with FIG. 5. The program(s) may be embodied in software stored on a non-transitory computer readable storage medium such as a CD-ROM, a floppy disk, a hard drive, a DVD, a Blu-ray disk, or a memory associated with the processor 512, but the entirety of the program(s) and/or parts thereof could alternatively be executed by a device other than the processor 512 and/or embodied in firmware or dedicated hardware. Further, although the example program(s) is/are described with reference to the flowcharts illustrated in FIGS. 3 and 4, many other methods of implementing the example malware detectors 122a-f of FIG. 1 and/or FIG. 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3 and 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 3 is a flowchart representative of machine readable instructions 300 which may be executed to implement the malware detectors 122a-f of FIG. 1 and/or FIG. 2. Although the example machine readable instructions 300 of FIG. 3 may be used to implement any of the example malware detectors 122a-f, the instructions are described below with reference to the malware detector 122a of FIG. 2. The example machine readable instructions 300 begin at block 302 where the network interface 202 obtains a first sample of network traffic. At block 304, the example threshold manager 204 sets a preliminary-analysis threshold. The preliminary-analysis threshold is for use in analyzing network traffic samples. At block 306, the example threshold manager 204 sets a malware-confirmation threshold. The malware-confirmation threshold is also for use in analyzing network traffic samples.

In the example of FIG. 3, at block 308, the threshold manager 204 selects the preliminary-analysis threshold. For example, the threshold manager 204 selects the preliminary-analysis threshold to initially analyze the network traffic sample to determine whether a preliminary-analysis network traffic sample is at least partially similar to malware and/or at least partially related to malicious activity. At block 310, the example network traffic classifier 206 classifies the preliminary-analysis network traffic sample. Example machine readable instructions to classify network traffic samples are described below in connection with FIG. 4. At block 312, the example classification controller 216, and/or, more generally, the example network traffic classifier 206, determines whether the preliminary-analysis network traffic sample has been classified as potentially malicious according to the preliminary-analysis threshold.

In the example of FIG. 3, in response to determining that the preliminary-analysis network traffic sample has not been classified as potentially malicious according to the preliminary-analysis threshold (block 312: NO), the example machine readable instructions 300 proceed to block 338. In response to determining that the preliminary-analysis network traffic sample has been classified as potentially malicious according to the preliminary-analysis threshold (block 312: YES), the example machine readable instructions 300 proceed to block 314. At block 314, the classification controller 216, and/or, more generally, the network traffic classifier 206, determines whether the classification score of the preliminary-analysis network traffic sample satisfies (e.g., is greater than or equal to) the malware-confirmation threshold. For example, the classification controller 216 compares the classification score of the preliminary-analysis network traffic sample to the malware-confirmation threshold.

In the illustrated example of FIG. 3, in response to determining that the classification score of the preliminary-analysis network traffic sample satisfies (e.g., is greater than or equal to) the malware-confirmation threshold (block 314: YES), the machine readable instructions 300 proceed to block 316. At block 316, the example report generator 218 generates a report indicating that potentially malicious activity has been detected. At block 318, the example classification controller 216, and/or, more generally, the network traffic classifier 206, determines whether the classification controller 216 is configured to perform a malware scan at a local computing device. In response to determining that the classification controller 216 is not configured to perform a malware scan at a local computing device (block 318: NO), the example machine readable instructions 300 proceed to block 324. In response to determining that the classification controller 216 is configured to perform a malware scan at a local computing device (block 318: YES), the example machine readable instructions 300 proceed to block 320. At block 320, the example classification controller 216, and/or, more generally, the example network traffic classifier 206, executes a malware scan of a local computing device. For example, when implementing the malware detector 122a, the network traffic classifier 206 scans the access point 102 of FIG. 1. Similarly, when implementing the malware detector 122b (FIG. 1), the network traffic classifier 206 scans the first computing device 104 of FIG. 1.

In the example of FIG. 3, at block 322, the classification controller 216, and/or, more generally, the network traffic classifier 206, determines whether the malware scan at the local computing device positively detected malware. In response to determining that the malware scan at the local computing device did not detect malware (block 322: NO), the example machine readable instructions 300 proceed to block 338. In response to determining that the malware scan at the local computing device positively identified malware (block 322: YES), the example machine readable instructions 300 proceed to block 324. At block 324, the example remediation controller 220 executes one or more remediation actions at the local computing device. For example, remediation actions include blocking network traffic between the source address and the destination address, alerting additional security software (e.g., alert security software) at the respective access point 102 and computing devices 104, 106, 108, 112, 114, quarantining files corresponding to a process, a program, and/or an application that initiated potentially malicious network traffic, stopping (e.g., halting, terminating, deleting, freezing, etc.) a process, a program, and/or an application in memory that initiated potentially malicious network traffic, blocking communications to a destination address, blocking communications from a source address, etc.

Returning to block 314, in response to determining that the classification score of the preliminary-analysis network traffic sample does not satisfy the malware-confirmation threshold (block 314: NO), the example machine readable instructions 300 proceed to block 326. At block 326, the example network interface 202 obtains one or more additional samples of network traffic to and/or from a destination address, a source address, and/or associated with a process at a local computing device. At block 328, the example network interface 202 selects one of the additional samples to analyze. At block 330, the example threshold manager 204 selects the malware-confirmation threshold as the threshold against which to analyze the network traffic sample. At block 332, the example network traffic classifier 206 classifies a confirmation-analysis network traffic sample. Example machine readable instructions to classify network traffic samples are described below in connection with FIG. 4.

In the example of FIG. 3, at block 334, the classification controller 216, and/or, more generally, the network traffic classifier 206, determines whether the confirmation-analysis network traffic sample has been classified as potentially malicious according to the malware-confirmation threshold. For example, the classification controller 216 compares the classification score of the confirmation-analysis network traffic sample to the malware-confirmation threshold. In response to determining that the confirmation-analysis network traffic sample has been classified as potentially malicious according to the malware-confirmation threshold (block 334: YES), the example machine readable instructions 300 proceed to block 316. In response to determining that the confirmation-analysis network traffic sample has not been classified as potentially malicious according to the malware-confirmation threshold (block 334: NO), the example machine readable instructions 300 proceed to block 336.

In the example illustrated in FIG. 3, at block 336, the classification controller 216, and/or, more generally, the network traffic classifier 206, determines whether there is a confirmation-analysis network traffic sample to analyze. In response to determining that there are confirmation-analysis network traffic samples to analyze (block 336: YES), control returns to block 328. In response to determining that there is not a confirmation-analysis network traffic sample to analyze (block 336: NO), the example machine readable instructions 300 proceed to block 338.

In the illustrated example of FIG. 3, at block 338, the classification controller 216, and/or, more generally, the network traffic classifier 206, determines whether to continue monitoring network traffic. In response to determining to continue monitoring network traffic (block 338: YES), control returns to block 302. For example, a condition that can cause the classification controller 216 to continue monitoring can be the triggering of a periodic timer that indicates to continue monitoring. In response to determining not to continue monitoring network traffic (block 338: NO), the example machine readable instructions 300 terminate. For example, a condition that can cause the classification controller 216 to not continue monitoring can be a loss of power, suspension, disablement, or termination of a malware detector including the classification controller 216, etc.

FIG. 4 is a flowchart representative of example machine readable instructions 310, 332 which may be executed to implement the malware detectors 122a-f of FIG. 1 and/or FIG. 2 to classify network traffic samples. The example machine readable instructions can be used to implement blocks 310 and 322 of FIG. 3. The machine readable instructions 310, 332 begin at block 402 where the decryption controller 208, and/or, more generally, the network traffic classifier 206, selects a decryption and/or deciphering algorithm to apply to a network traffic sample. At block 404, the example decryption controller 208, and/or, more generally, the example network traffic classifier 206, executes the decryption and/or deciphering algorithm (e.g., the selected decipher algorithm and/or the selected decryption algorithm) to decrypt and/or decipher the network traffic sample.

In the example of FIG. 4, at block 406, the decryption controller 208, and/or, more generally, the network traffic classifier 206, determines whether the selected deciphering and/or decryption algorithm deciphered and/or decrypted the network traffic sample. In response to determining that the selected deciphering and/or decryption algorithm did not decipher and/or decrypt the network traffic sample (block 406: NO), the example machine readable instructions 310, 332 proceed to block 408. At block 408, the example decryption controller 208, and/or, more generally, the example network traffic classifier 206, determines whether there is an additional decryption and/or deciphering algorithm (e.g., an additional decryption algorithm, an additional decipher algorithm, additional decryption algorithms, additional decipher algorithms, etc.) to apply to the network traffic sample. In response to determining that there is an additional decryption and/or deciphering algorithm to apply to the network traffic sample (block 408: YES), control returns to block 402 (e.g., to select an alternate decipher algorithm, an alternate decryption algorithm, etc.). In response to determining that there is not an additional decryption and/or deciphering algorithm to apply to the network traffic sample (block 408: NO), the example machine readable instructions 310, 332 proceed to block 410. At block 410, the example classification controller 216, and/or, more generally, the example network traffic classifier 206, classifies the network traffic sample as unknown. After block 410, the example machine readable instructions 310, 332 proceed to block 426.

Returning to block 406, in response to determining that the selected deciphering and/or decryption algorithm did decipher and/or decrypt the network traffic sample (block 406: YES), the example machine readable instructions 310, 332 proceed to block 412. At block 412, the example decryption controller 208, and/or, more generally, the example network traffic classifier 206, obtains a plain text representation of the network traffic sample. At block 413, the network traffic classifier 206 determines one or more maliciousness scores for a network traffic sample. For example, to execute block 413, the network traffic classifier 206 can execute at least one of blocks 414, 416, 417, and 418. Additionally, or alternatively, the network traffic classifier 206 can determine any number of scores. At block 414, the example language analyzer 210, and/or, more generally, the example network traffic classifier 206, determines a first score for similarity of the plain text representation of the network traffic sample to a conversational language. For example, the first score corresponds to a similarity between the network traffic sample and a conversational language (e.g., English, French, Arabic, etc.). At block 416, the example code analyzer 212, and/or, more generally, the example network traffic classifier 206, determines a second score for similarity of the plain text representation of the network traffic sample to non-executable source code (e.g., C, C#, C+, etc.). For example, the second score corresponds to a similarity between the network traffic sample and a non-executable source code programming language (e.g., C#, C++, C, etc.). At block 417, the example code analyzer 212, and/or, more generally, the example network traffic classifier 206, determines a third score for similarity of the plain text representation of the network traffic sample to an executable source code programming language. For example, the third score corresponds to a similarity between the network traffic sample and an executable source code programming language (e.g., Java, Swift, Python, etc.). At block 418, the example executable analyzer 214, and/or, more generally, the example network traffic classifier 206, determines a fourth score for similarity of the plain text representation of the network traffic sample to an executable file. For example, the fourth score corresponds to a similarity between the network traffic sample and executable object code and/or an executable file (e.g., a portable executable file, etc.).

In the example of FIG. 4, at block 420, the classification controller 216, and/or, more generally, the example network traffic classifier 206, determines a classification score (e.g., a combined score) for the network traffic sample based on the first score, the second score, the third score, and/or the fourth score. At block 422, the example classification controller 216, and/or, more generally, the example network traffic classifier 206, determines whether the classification score satisfies (e.g., is greater than or equal to) a selected threshold. The threshold is selected by the threshold manager 204 at block 308 or block 330 of FIG. 3. For example, when the machine readable instructions of FIG. 4 implement block 310 of FIG. 3, the classification controller 216 compares the classification score of the preliminary-analysis network traffic sample to the preliminary-analysis threshold at block 422. Alternatively, when the machine readable instructions of FIG. 4 implement block 332 of FIG. 3, the classification controller 216 compares the classification score of one or more confirmation-analysis network traffic samples to the malware-confirmation threshold at block 422. In response to determining that the combined score does not satisfy the threshold (block 422: NO), the example machine readable instructions 310, 332 proceed to block 410. In response to determining that the combined score does satisfy the threshold (block 422: YES), the example machine readable instructions 310, 332 proceed to block 424.

In the example illustrated in FIG. 4, at block 424, the classification controller 216, and/or, more generally, the network traffic classifier 206, classifies the network traffic sample as potentially malicious. At block 426, the example classification controller 216, and/or, more generally, the example network traffic classifier 206, transmits a classification package for the network traffic sample including at least the classification score of the network traffic sample. After block 426, the machine readable instructions 310, 332 return to the machine readable instructions 300 at blocks 312 and 334, respectively.

Figure 5:
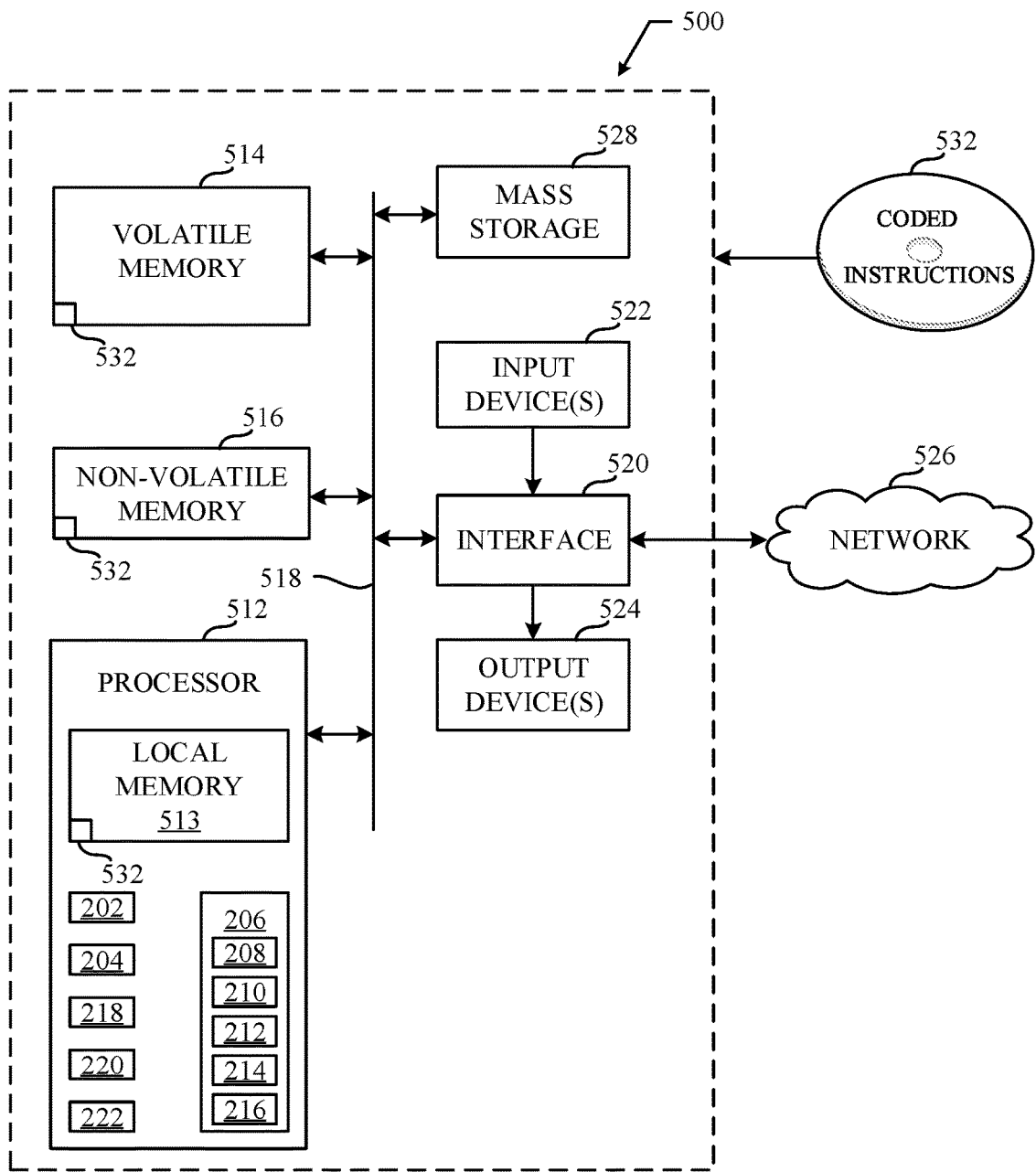
FIG. 5 is a block diagram of an example processing platform structured to execute the instructions of FIGS. 3 and/or 4 to implement at least one of the malware detectors of FIGS. 1 and/or 2.

FIG. 5 is a block diagram of an example processor platform 500 structured to execute the instructions represented in FIGS. 3 and 4 to implement the malware detectors 122*a-f* of FIGS. 1 and/or 2. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor 512 may be a semiconductor based (e.g., silicon based) device. In this example, the processor 512 implements the example network interface 202, the example threshold manager 204, the example network traffic classifier 206, the example decryption controller 208, the example language analyzer 210, the example code analyzer 212, the example executable analyzer 214, the example classification controller 216, the example report generator 218, the example remediation controller 220, and/or the example database 222 of FIG. 2.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a PCI express interface.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 528 for storing software and/or data. Examples of such mass storage devices 528 include floppy disk drives, hard drive disks, compact disk drives, Blu-ray disk drives, redundant array of independent disks (RAID) systems, and digital versatile disk (DVD) drives.

Example machine executable instructions 532 represented in FIGS. 3 and 4 may be stored in the mass storage device 528, in the volatile memory 514, in the non-volatile memory 516, and/or on a removable non-transitory computer readable storage medium such as a CD or DVD.

From the foregoing, it will be appreciated that example methods, apparatus and articles of manufacture have been disclosed that detect malware based on network traffic analysis. The disclosed methods, apparatus, and articles of manufacture disclosed herein increase the security of using a computing device relative to prior techniques. Additionally, examples disclosed herein reduce wasteful computation and/or power consumption that is expended when a computer experiences malicious attacks relative to prior techniques. Examples disclosed herein, improve the amount and/or type of malware that can be detected and/or prevented relative to prior techniques. The disclosed methods, apparatus and articles of manufacture improve the efficiency of using a computing device by reducing computational burden and network resource consumption associated with analyzing network traffic data relative to prior techniques by employing the preliminary-analysis threshold and the malware-confirmation threshold. Such thresholding, as disclosed herein, optimizes analysis of network traffic data while reducing the network resources consumed during network traffic analysis relative to prior techniques. The disclosed methods, apparatus and articles of manufacture are accordingly directed to one or more improvement(s) in the functioning of a computer.

Example methods, apparatus, systems, and articles of manufacture to detect malware based on network traffic analysis are disclosed herein. Further examples and combinations thereof include the following:

Example 1 includes an apparatus comprising a classification controller to in response to a first classification score of a first network traffic sample satisfying a first threshold, determine whether a second classification score of a second network traffic sample satisfies a second threshold, and in response to the second classification score of the second network traffic sample satisfying the second threshold, classify network traffic associated with the first network traffic sample and the second network traffic sample as potentially malicious network traffic, and a remediation controller to, in response to the network traffic being classified as the potentially malicious network traffic, execute a remediation action to remediate malicious activity associated with the potentially malicious network traffic.

Example 2 includes the apparatus of example 1, further including a decryption controller to execute a first decipher algorithm selected from a database, the database including additional decipher algorithms to decipher the first network traffic sample, in response to the first network traffic sample not being deciphered by the first decipher algorithm, select a second decipher algorithm from the database to decipher the first network traffic sample, and in response to the second decipher algorithm deciphering the first network traffic sample, obtain a plain text representation of the first network traffic sample.

Example 3 includes the apparatus of example 1, further including a language analyzer to determine a first score associated with a first similarity of a plain text representation of: (a) the first network traffic sample or (b) the second network traffic sample to a conversational language, a code analyzer to determine a second score associated with a second similarity of the plain text representation of: (a) the first network traffic sample or (b) the second network traffic sample to a programming language, and an executable analyzer to determine a third score associated with a third similarity of the plain text representation of: (a) the first network traffic sample or (b) the second network traffic sample to an executable file.

Example 4 includes the apparatus of example 3, wherein the classification controller is to determine the first classification score associated with a similarity of the plain text representation of the first network traffic sample to malware based on the first score, the second score, and the third score, and determine the second classification score associated with a similarity of the plain text representation of the second network traffic sample to malware based on the first score, the second score, and the third score.

Example 5 includes the apparatus of example 1, wherein the first threshold and the second threshold correspond to similarities to malware.

Example 6 includes the apparatus of example 1, further including a report generator to generate a report including at least one of the first classification score, the second classification score, an indication of whether the first network traffic sample and the second network traffic sample are potentially malicious, a decipher algorithm that allowed decryption of the first network traffic sample and the second network traffic sample.

Example 7 includes the apparatus of example 1, wherein the remediation controller is to at least one of block network traffic between a source address and a destination address, alert security software at a computing device of the potentially malicious network traffic, quarantine files corresponding to a process that initiated the potentially malicious network traffic, or stop the process in memory that initiated the potentially malicious network traffic sample.

Example 8 includes a non-transitory computer readable storage medium comprising instructions which, when executed, cause at least one processor to at least in response to a first classification score of a first network traffic sample satisfying a first threshold, determine whether a second classification score of a second network traffic sample satisfies a second threshold, in response to the second classification score of the second network traffic sample satisfying the second threshold, classify network traffic associated with the first network traffic sample and the second network traffic sample as potentially malicious network traffic, and in response to the network traffic being classified as the potentially malicious network traffic, execute a remediation action to remediate malicious activity associated with the potentially malicious network traffic.

Example 9 includes the non-transitory computer readable storage medium of example 8, wherein the instructions, when executed, cause the at least one processor to execute a first decipher algorithm selected from a database, the database including additional decipher algorithms to decipher the first network traffic sample, in response to the first network traffic sample not being deciphered by the first decipher algorithm, select a second decipher algorithm from the database to decipher the first network traffic sample, and in response to the second decipher algorithm deciphering the first network traffic sample, obtain a plain text representation of the first network traffic sample.

Example 10 includes the non-transitory computer readable storage medium of example 8, wherein the instructions, when executed, cause the at least one processor to determine a first score associated with a first similarity of a plain text representation of: (a) the first network traffic sample or (b) the second network traffic sample to a conversational language, determine a second score associated with a second similarity of the plain text representation of: (a) the first network traffic sample or (b) the second network traffic sample to a programming language, and determine a third score associated with a third similarity of the plain text representation of: (a) the second network traffic sample or (b) the second network traffic sample to an executable file.

Example 11 includes the non-transitory computer readable storage medium of example 10, wherein the instructions, when executed, cause the at least one processor to determine the first classification score associated with a similarity of the plain text representation of the first network traffic sample to malware based on the first score, the second score, and the third score, and determine the second classification score associated with a similarity of the plain text representation of the second network traffic sample to malware based on the first score, the second score, and the third score.

Example 12 includes the non-transitory computer readable storage medium of example 8, wherein the first threshold and the second threshold correspond to similarities to malware.

Example 13 includes the non-transitory computer readable storage medium of example 8, wherein the instructions, when executed, cause the at least one processor to generate a report including at least one of the first classification score, the second classification score, an indication of whether the first network traffic sample and the second network traffic sample are potentially malicious, a decipher algorithm that allowed decryption of the first network traffic sample and the second network traffic sample.

Example 14 includes the non-transitory computer readable storage medium of example 8, wherein the instructions, when executed, cause the at least one processor to at least one of block network traffic between a source address and a destination address, alert security software at a computing device of the potentially malicious network traffic, quarantine files corresponding to a process that initiated the potentially malicious network traffic, or stop the process in memory that initiated the potentially malicious network traffic sample.

Example 15 includes a method comprising in response to a first classification score of a first network traffic sample satisfying a first threshold, determining whether a second classification score of a second network traffic sample satisfies a second threshold, in response to the second classification score of the second network traffic sample satisfying the second threshold, classifying network traffic associated with the first network traffic sample and the second network traffic sample as potentially malicious network traffic, and in response to the network traffic being classified as the potentially malicious network traffic, executing a remediation action to remediate malicious activity associated with the potentially malicious network traffic.

Example 16 includes the method of example 15, further including executing a first decipher algorithm selected from a database, the database including additional decipher algorithms to decipher the first network traffic sample, in response to the first network traffic sample not being deciphered by the first decipher algorithm, selecting a second decipher algorithm from the database to decipher the first network traffic sample, and in response to the second decipher algorithm deciphering the first network traffic sample, obtaining a plain text representation of the first network traffic sample.

Example 17 includes the method of example 15, further including determining a first score associated with a first similarity of a plain text representation of: (a) the first network traffic sample or (b) the second network traffic sample to a conversational language, determining a second score associated with a second similarity of the plain text representation of: (a) the first network traffic sample or (b) the second network traffic sample to a programming language, and determining a third score associated with a third similarity of the plain text representation of: (a) the first network traffic sample or (b) the second network traffic sample to an executable file.

Example 18 includes the method of example 17, further including determining the first classification score associated with a similarity of the plain text representation of the first network traffic sample to malware based on the first score, the second score, and the third score, and determining the second classification score associated with a similarity of the plain text representation of the second network traffic sample to malware based on the first score, the second score, and the third score.

Example 19 includes the method of example 15, wherein the first threshold and the second threshold correspond to similarities to malware.

Example 20 includes the method of example 15, further including at least one of blocking network traffic between a source address and a destination address, alerting security software at a computing device of the potentially malicious network traffic, quarantining files corresponding to a process that initiated the potentially malicious network traffic, or stopping the process in memory that initiated the potentially malicious network traffic sample.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   decryption control circuitry to decipher a first network traffic sample by iteratively processing the first network traffic sample utilizing a plurality of decipher algorithms included in a database, ones of the decipher algorithms corresponding to encryption algorithms known to be utilized to encrypt malware;
   classification control circuitry to:
      determine a first classification score based on a sum of at least a first weighted score and a second weighted score, the first weighted score corresponding to a first type of content in the first network traffic sample, the second weighted score corresponding to a second type of content in the first network traffic sample, the first weighted score weighted lower than the second weighted score based on the first type of content being less likely to be malicious than the second type of content;
      after the first classification score of the first network traffic sample satisfies a first threshold, determine whether a second classification score of a second network traffic sample satisfies a second threshold; and
      after the second classification score of the second network traffic sample satisfies the second threshold, classify network traffic associated with the first network traffic sample and the second network traffic sample as potentially malicious network traffic; and
   remediation control circuitry to, after the network traffic is classified as the potentially malicious network traffic, execute a remediation action to remediate malicious activity associated with the potentially malicious network traffic.

2. The apparatus of claim 1, wherein the decryption control circuitry is to:
   execute a first decipher algorithm to decipher the first network traffic sample;
   in response to the first network traffic sample not being deciphered by the first decipher algorithm, select a second decipher algorithm to decipher the first network traffic sample, the first decipher algorithm and the second decipher algorithm selected from the plurality of decipher algorithms;
   in response to the first network traffic sample not being deciphered by the second decipher algorithm, select a third decipher algorithm to decipher the first network traffic sample, the third decipher algorithm selected from the plurality of decipher algorithms; and
   in response to the third decipher algorithm deciphering the first network traffic sample, obtain a plain text representation of the first network traffic sample.

3. The apparatus of claim 1, further including:
   language analysis circuitry to determine a first score associated with a first similarity of a conversational language to a plain text representation of: (a) the first network traffic sample or (b) the second network traffic sample;
   code analysis circuitry to determine a second score associated with a second similarity of a programming language to the plain text representation of: (a) the first network traffic sample or (b) the second network traffic sample; and
   executable analysis circuitry to determine a third score associated with a third similarity of an executable file to the plain text representation of: (a) the first network traffic sample or (b) the second network traffic sample.

4. The apparatus of claim 3, wherein the classification control circuitry is to:
   determine the first weighted score based on the first score and the second weighted score based on the second score;
   determine the first classification score based on the first weighted score, the second weighted score, and the third score, the first classification score associated with a fourth similarity of the plain text representation of the first network traffic sample to the malware; and
   determine the second classification score based on the first weighted score, the second weighted score, and the third score, the second classification score associated with a fifth similarity of the plain text representation of the second network traffic sample to the malware.

5. The apparatus of claim 1, wherein the first threshold and the second threshold correspond to similarities to the malware, and the second threshold is indicative of a greater level of similarity to the malware than the first threshold.

6. The apparatus of claim 1, further including report generation circuitry to generate a report including at least one of the first classification score, the second classification score, an indication of whether the first network traffic sample and the second network traffic sample are potentially malicious, or one of the decipher algorithms that allowed deciphering of the first network traffic sample and the second network traffic sample.

7. The apparatus of claim 1, wherein the network traffic is first network traffic, and the remediation control circuitry is to at least one of:
   block second network traffic between a source address and a destination address;
   alert security software at a computing device of the potentially malicious network traffic;
   quarantine files corresponding to a process that initiated the potentially malicious network traffic; or
   stop, in memory, the process that initiated the potentially malicious network traffic.

8. A non-transitory computer readable storage medium comprising instructions to cause programmable circuitry to at least:
- decipher a first network traffic sample by iteratively processing the first network traffic sample utilizing a plurality of decipher algorithms included in a database, ones of the decipher algorithms corresponding to encryption algorithms known to be utilized to encrypt malware;
- determine a first classification score based on a presence of first type of content in the first network traffic sample and a presence of second type of content in the first network traffic sample, the presence of the first type of content weighted lower than the presence of the second type of content based on the first type of content being less likely to be malicious than the second type of content;
- after the first classification score of the first network traffic sample satisfies a first threshold, determine whether a second classification score of a second network traffic sample satisfies a second threshold;
- after the second classification score of the second network traffic sample satisfies the second threshold, classify network traffic associated with the first network traffic sample and the second network traffic sample as potentially malicious network traffic; and
- after the network traffic is classified as the potentially malicious network traffic, execute a remediation action to remediate malicious activity associated with the potentially malicious network traffic.

9. The non-transitory computer readable storage medium of claim 8, wherein the instructions are to cause the programmable circuitry to:
- execute a first decipher algorithm to decipher the first network traffic sample;
- in response to the first network traffic sample not being deciphered by the first decipher algorithm, select a second decipher algorithm to decipher the first network traffic sample, the first decipher algorithm and the second decipher algorithm selected from the plurality of decipher algorithms;
- in response to the first network traffic sample not being deciphered by the second decipher algorithm, select a third decipher algorithm to decipher the first network traffic sample, the third decipher algorithm selected from the plurality of decipher algorithms; and
- in response to the third decipher algorithm deciphering the first network traffic sample, obtain a plain text representation of the first network traffic sample.

10. The non-transitory computer readable storage medium of claim 8, wherein the instructions are to cause the programmable circuitry to:
- determine a first score associated with a first similarity of a conversational language to a plain text representation of: (a) the first network traffic sample or (b) the second network traffic sample;
- determine a second score associated with a second similarity of a programming language to the plain text representation of: (a) the first network traffic sample or (b) the second network traffic sample; and
- determine a third score associated with a third similarity of an executable file to the plain text representation of: (a) the second network traffic sample or (b) the second network traffic sample.

11. The non-transitory computer readable storage medium of claim 10, wherein the instructions are to cause the programmable circuitry to:
- determine the first classification score based on the first score, the second score, and the third score, the first classification score associated with a fourth similarity of the plain text representation of the first network traffic sample to the malware; and
- determine the second classification score based on the first score, the second score, and the third score, the second classification score associated with a fifth similarity of the plain text representation of the second network traffic sample to the malware.

12. The non-transitory computer readable storage medium of claim 8, wherein the first threshold and the second threshold correspond to similarities to malware, and the second threshold is indicative of a greater level of similarity to the malware than the first threshold.

13. The non-transitory computer readable storage medium of claim 8, wherein the instructions are to cause the programmable circuitry to generate a report including at least one of the first classification score, the second classification score, an indication of whether the first network traffic sample and the second network traffic sample are potentially malicious, or one of the decipher algorithms that allowed deciphering of the first network traffic sample and the second network traffic sample.

14. The non-transitory computer readable storage medium of claim 8, wherein the network traffic is first network traffic, and the instructions are to cause the programmable circuitry to at least one of:
- block second network traffic between a source address and a destination address;
- alert security software at a computing device of the potentially malicious network traffic;
- quarantine files corresponding to a process that initiated the potentially malicious network traffic; or
- stop, in memory, the process that initiated the potentially malicious network traffic.

15. A method comprising:
- deciphering, by executing an instruction with programmable circuitry, a first network traffic sample by iteratively processing the first network traffic sample utilizing a plurality of decipher algorithms included in a database, ones of the decipher algorithms corresponding to encryption algorithms known to be utilized to encrypt malware;
- determining, by executing an instruction with the programmable circuitry, a first classification score based on a sum of at least a first weighted score and a second weighted score, the first weighted score corresponding to a first type of content in the first network traffic sample, the second weighted score corresponding to a second type of content in the first network traffic sample, the first weighted score weighted lower than the second weighted score based on the first type of content being less likely to be malicious than the second type of content;
- after the first classification score of the first network traffic sample satisfies a first threshold, determining, by executing an instruction with the programmable circuitry, whether a second classification score of a second network traffic sample satisfies a second threshold, the second threshold indicative of a greater level of similarity to malware than the first threshold;
- after the second classification score of the second network traffic sample satisfies the second threshold, classifying, by executing an instruction with the programmable circuitry, network traffic associated with the first network traffic sample and the second network traffic sample as potentially malicious network traffic; and after the network traffic is classified as the potentially malicious network traffic, executing, by executing an instruction with the programmable circuitry, a remediation action to remediate malicious activity associated with the potentially malicious network traffic.

16. The method of claim 15, further including:

executing a first decipher algorithm to decipher the first network traffic sample;

in response to the first network traffic sample not being deciphered by the first decipher algorithm, selecting a second decipher algorithm to decipher the first network traffic sample, the first decipher algorithm and the second decipher algorithm selected from the plurality of decipher algorithms;

in response to the first network traffic sample not being deciphered by the second decipher algorithm, selecting a third decipher algorithm to decipher the first network traffic sample, the third decipher algorithm selected from the plurality of decipher algorithms; and in response to the third decipher algorithm deciphering the first network traffic sample, obtaining a plain text representation of the first network traffic sample.

17. The method of claim 15, further including:

determining a first score associated with a first similarity of a conversational language to a plain text representation of: (a) the first network traffic sample or (b) the second network traffic sample;

determining a second score associated with a second similarity of a programming language to the plain text representation of: (a) the first network traffic sample or (b) the second network traffic sample; and determining a third score associated with a third similarity of an executable file to the plain text representation of: (a) the first network traffic sample or (b) the second network traffic sample.

18. The method of claim 17, further including:

determining the first weighted score based on the first score and the second weighted score based on the second score.

determining the first classification score based on the first weighted score, the second weighted score, and the third score, the first classification score associated with a fourth similarity of the plain text representation of the first network traffic sample to the malware; and determining the second classification score based on the first weighted score, the second weighted score, and the third score, the second classification score associated with a fifth similarity of the plain text representation of the second network traffic sample to the malware.

19. The method of claim 15, wherein the network traffic is first network traffic, and the method further includes at least one of:

blocking second network traffic between a source address and a destination address;

alerting security software at a computing device of the potentially malicious network traffic;

quarantining files corresponding to a process that initiated the potentially malicious network traffic; or stopping, in memory, the process that initiated the potentially malicious network traffic.

20. A system comprising:

memory;

instructions in the system; and programmable circuitry to be programmed by the instructions to at least:

decipher a first network traffic sample by iteratively processing the first network traffic sample utilizing a plurality of decipher algorithms included in a database, ones of the decipher algorithms corresponding to encryption algorithms known to be utilized to encrypt malware;

determine a first classification score based on a presence of first type of content and a presence of second type of content in the first network traffic sample, the presence of the first type of content weighted lower than the presence of the second type of content based on the first type of content being less likely to be malicious than the second type of content;

after the first classification score of the first network traffic sample satisfies a first threshold, determine whether a second classification score of a second network traffic sample satisfies a second threshold, the second threshold indicative of a greater level of similarity to malware than the first threshold;

after the second classification score of the second network traffic sample satisfies the second threshold, classify network traffic associated with the first network traffic sample and the second network traffic sample as potentially malicious network traffic; and after the network traffic is classified as the potentially malicious network traffic, execute a remediation action to remediate malicious activity associated with the potentially malicious network traffic.

21. The system of claim 20, wherein the programmable circuitry is to:

execute a first decipher algorithm to decipher the first network traffic sample;

in response to the first network traffic sample not being deciphered by the first decipher algorithm, select a second decipher algorithm to decipher the first network traffic sample, the first decipher algorithm and the second decipher algorithm selected from the plurality of decipher algorithms;

in response to the first network traffic sample not being deciphered by the second decipher algorithm, select a third decipher algorithm to decipher the first network traffic sample, the third decipher algorithm selected from the plurality of decipher algorithms; and in response to the third decipher algorithm deciphering the first network traffic sample, obtain a plain text representation of the first network traffic sample.

22. The system of claim 20, wherein the programmable circuitry is to:

determine a first score associated with a first similarity of a conversational language to a plain text representation of: (a) the first network traffic sample or (b) the second network traffic sample;

determine a second score associated with a second similarity of a programming language to the plain text representation of: (a) the first network traffic sample or (b) the second network traffic sample; and determine a third score associated with a third similarity of an executable file to the plain text representation of: (a) the second network traffic sample or (b) the second network traffic sample.

23. The system of claim 22, wherein the programmable circuitry is to:

determine the first classification score based on the first score, the second score, and the third score, the first classification score associated with a fourth similarity of the plain text representation of the first network traffic sample to the malware; and determine the second classification score based on the first score, the second score, and the third score, the second classification score associated with a fifth similarity of the plain text representation of the second network traffic sample to the malware.

24. The system of claim 20, wherein the programmable circuitry is to generate a report including at least one of the first classification score, the second classification score, an indication of whether the first network traffic sample and the second network traffic sample are potentially malicious, or one of the decipher algorithms that allowed deciphering of the first network traffic sample and the second network traffic sample.

25. The system of claim 20, wherein the network traffic is first network traffic, and the programmable circuitry is to at least one of:

block second network traffic between a source address and a destination address;

alert security software at a computing device of the potentially malicious network traffic;

quarantine files corresponding to a process that initiated the potentially malicious network traffic; or stop, in the memory, the process that initiated the potentially malicious network traffic.

26. The method of claim 15, wherein the first network traffic sample is a preliminary-analysis network traffic sample, the first threshold is a preliminary-analysis threshold, the second network traffic sample is a confirmation-analysis network traffic sample, and the second threshold is a malware-confirmation threshold.

27. The system of claim 20, wherein the first network traffic sample is a preliminary-analysis network traffic sample, the first threshold is a preliminary-analysis threshold, the second network traffic sample is a confirmation-analysis network traffic sample, and the second threshold is a malware-confirmation threshold.

* * * * *